J. P. KNECHT.
LANTERN.
APPLICATION FILED MAR. 23, 1916.
1,188,278.
Patented June 20, 1916.
2 SHEETS—SHEET 1.
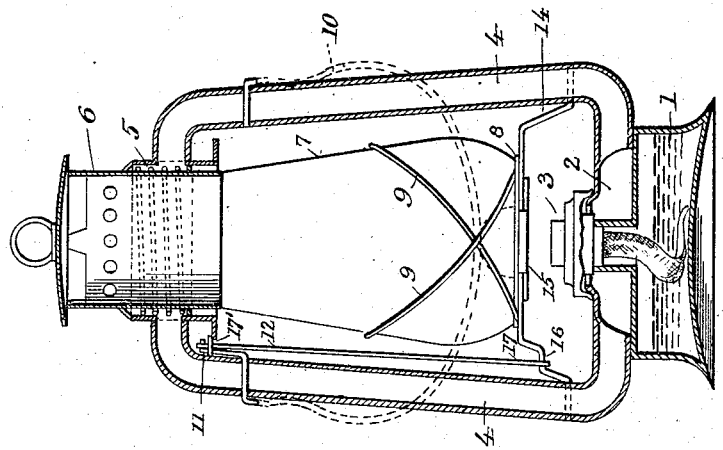
Witnesses
Jos. C. Cobb.
Inventor
John P. Knecht
By Victor J. Evans
Attorney J. P. KNECHT.
LANTERN.
APPLICATION FILED MAR. 23, 1916.
1,188,278.
Patented June 20, 1916.
2 SHEETS—SHEET 2.
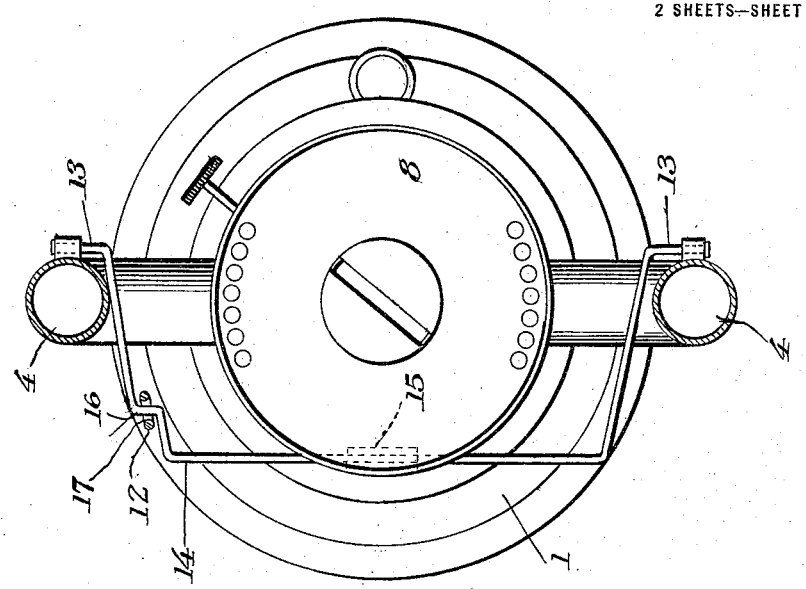
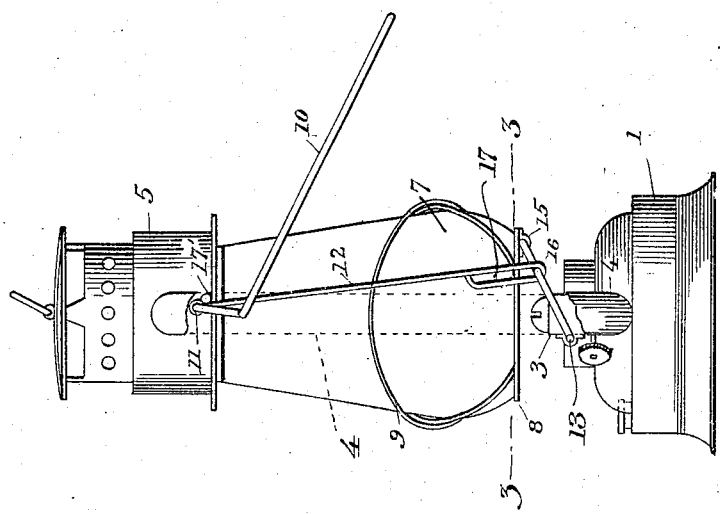
Witnesses
Geo. C. Cobb.
Inventor
John P. Knecht
By Victor J. Evans
Attorney

UNITED STATES PATENT OFFICE.

JOHN P. KNECHT, OF BATH, PENNSYLVANIA.

LANTERN.

1,188,278.  Specification of Letters Patent. Patented June 20, 1916.

Application filed March 23, 1916. Serial No. 86,261.

*To all whom it may concern:*

Be it known that I, JOHN P. KNECHT, a citizen of the United States, residing at Bath, in the county of Northampton and State of Pennsylvania, have invented new and useful Improvements in Lanterns, of which the following is a specification.

The present invention relates to improvements in lanterns.

In carrying out my invention I propose to arrange the parts so that the handle of an ordinary tubular lantern may be employed for raising the globe that access may be obtained to the burner.

It is also my purpose to construct a globe raising device for tubular lanterns that is operated by the bail or handle of the lantern and wherein when the bail is swung against the lantern, to one side of the lantern, the globe will be held in an elevated position, but which at the same time has its parts so arranged that the lantern may be swung upon the handle to a determined degree without interfering with the said globe.

It is a still further object of the invention to construct a lantern of this class wherein the globe may be elevated by the handle but wherein the parts are so constructed and arranged as to permit of the globe being elevated without manipulating the handle or without interfering with the handle.

With the above and other objects in view, the improvement resides in the construction, combination and arrangement of parts set forth in the following specification and falling within the scope of the appended claim.

In the drawings: Figure 1 is a perspective view of a lantern constructed in accordance with the present invention, the globe being seated, Fig. 2 is a sectional view taken in a line with the connecting member between the handle and the crank member which is hingedly secured to the globe plate or rest and showing the globe in its elevated position, Fig. 3 is a horizontal sectional view approximately on the line 3—3 of Fig. 2, and Fig. 4 is a vertical longitudinal sectional view in a line with the air tubes.

Referring now to the drawings in detail, the numeral 1 designates the oil pot or reservoir, 2 the air chamber formed at the top of the reservoir and 3 the burner.

The numerals 4 designate the air tubes which communicate with the air chamber 2 and which are extended vertically therefrom and have their upper ends offset and connected with the sleeve 5 which is disposed directly above the burner 3 and within which is arranged the spring pressed bell 6 that engages with the upper edge of the globe 7 forcing the same upon the globe plate 8, while the numerals 9 designate the guard wires for the globe which are connected to the globe plate. The handle or bail is indicated by the numeral 10 and has both of its ends offset and received in bearing openings in the air tubes 4 at the upper ends thereof. One of the offset ends of the bail or handle 10 is formed with a right angular extension 11 that terminates in an eye and to the end of this offset portion is loosely connected a rod 12.

Journaled in suitable bearing openings in the air tubes 4 directly above the reservoir 1 are the offset ends 13 of a cranked wire 14. This wire at approximately the central portion thereof passes through a sleeve 15 formed in the underface of the globe plate 8, to one side of the burner opening therein, and the side or arm of the crank wire 14 arranged below the angular end 11 of the handle 10 is crooked or otherwise bent, as at 16, and is received in an elongated passage 17 provided in the end of the rod 12, the said passage being formed by bending the end of the rod upon itself.

The numeral 17' designates a connecting member between one of the air tubes 4 and the sleeve 5, the said member 17' serving as a stop as illustrated in Fig. 2 of the drawings to contact with the angular or offset end 11 of the bail or handle to limit the swinging of the handle when the same is operated to raise the globe 7 and also to retain the said globe in its elevated position. The stop member 17', it will be noted, is arranged off or beyond the center of the bearing provided in the air tube 4 for the angular end of the bail upon which is formed the angular extension 11 so that the globe will be thus effectively held in its elevated position against the pressure of the spring between the sleeve 5 and the bell 6.

Having thus described the invention, what I claim is:

The combination with a tubular lantern having a bail-shaped handle provided with offset ends which are received in bearing openings in the tubes of the lantern and one of said ends extending through its bearing and being formed with an angular extension, a stop member upon the tube disposed to contact with the said angular end when the handle is swung toward the side of the lantern, a rod member connected to the said angular end of the handle, a crank member journaled in bearings in the tubes and having its connecting portion disposed below but in a line with the globe plate of the lantern, a sleeve upon the globe plate receiving the said connecting portion of the crank, one of the arms of the crank being offset, and the free end of the rod being bent upon itself and receiving the said offset portion of the crank.

In testimony whereof I affix my signature in presence of two witnesses.

JOHN P. KNECHT.

Witnesses:
HOWARD P. KOCH,
ANNIE M. KOCH.

Copies of this patent may be obtained for five cents each, by addressing the "Commissioner of Patents, Washington, D. C."